US011946735B2

United States Patent
Gou et al.

(10) Patent No.: US 11,946,735 B2
(45) Date of Patent: Apr. 2, 2024

(54) METHOD FOR MEASURING DEVIATION ANGLE OF FATIGUE MICROCRACK BASED ON NONLINEAR ULTRASOUND

(71) Applicant: Southwest Jiaotong University, Chengdu (CN)

(72) Inventors: Guoqing Gou, Chengdu (CN); Feifei Qiu, Chengdu (CN); Bing Chen, Chengdu (CN); Yuzi Hu, Chengdu (CN); Zhongyin Zhu, Chengdu (CN); Junjun Jin, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 17/980,411

(22) Filed: Nov. 3, 2022

(65) Prior Publication Data

US 2023/0048646 A1 Feb. 16, 2023

Related U.S. Application Data

(63) Continuation of application No. PCT/CN2022/075445, filed on Feb. 8, 2022.

(51) Int. Cl.
*G01B 17/00* (2006.01)
*G01N 29/04* (2006.01)
*G01N 29/44* (2006.01)

(52) U.S. Cl.
CPC ........... *G01B 17/00* (2013.01); *G01N 29/04* (2013.01); *G01N 29/44* (2013.01); *G01N 2291/0234* (2013.01)

(58) Field of Classification Search
CPC ........ G01B 17/00; G01B 17/04; G01N 29/44; G01N 2291/0234
See application file for complete search history.

(56) References Cited

U.S. PATENT DOCUMENTS

| 2011/0030479 A1* | 2/2011 | Murai ............... G01N 29/223 73/632 |
| 2016/0109416 A1 | 4/2016 | Sohn et al. |
| 2019/0033263 A1 | 1/2019 | Giurgiutiu et al. |

FOREIGN PATENT DOCUMENTS

| CN | 104359977 A | 2/2015 |
| CN | 105372330 A * | 3/2016 |

(Continued)

OTHER PUBLICATIONS

Kim et al., "Modeling Ultrasonic Pulse-Echo Signals from a Flat-Bottom Hole in Immersion Testing Using a Multi-Gaussian Beam", Journal of Nondestructive Evaluation, vol. 23, No. 1, Mar. 2004 (Year: 2004).*

(Continued)

*Primary Examiner* — Regis J Betsch

(57) ABSTRACT

Disclosed is a method fir measuring a deviation angle of a fatigue microcrack based on nonlinear ultrasound, comprising: preliminarily positioning a fatigue microcrack to obtain a center of the microcrack; selecting a horizontal positive direction, and defining an orientation angle; drawing a positive circumference on a surface of a metal plate, and selecting a fixed interval angle; placing an excitation sensor and a receiving sensor on the drawn positive circumference according to the orientation angle; ultrasonically testing each group of ultrasonic sensing paths, and recording time domain waveform signals formed by each group of ultrasonic sensing paths; converting each group of time domain waveform signals into a corresponding frequency domain graph, extracting an ultrasonic fundamental wave signal amplitude and a second harmonic waveform amplitude, and calculating a relative nonlinear coefficient; drawing an orientation angle-relative nonlinear coefficient polar coordinate graph; and determining a deviation angle of the microcrack.

12 Claims, 2 Drawing Sheets

(56) References Cited

FOREIGN PATENT DOCUMENTS

| CN | 105372330 A | 3/2016 |
|---|---|---|
| CN | 108709934 A | 10/2018 |
| CN | 108872393 A | 11/2018 |
| CN | 110988136 A | 4/2020 |
| CN | 111157629 A | 5/2020 |
| JP | 2001305109 A | 10/2001 |

OTHER PUBLICATIONS

Huifang Wang,. "Research on Detection and Localization of Metal Fatigue Damage Based on Nonlinear Ultrasonic [D]", Tianjin University, 2017.

Zichuan Liao et al., "Nonlinear ultrasonic damage evaluation system research and development and its application on S355J2W steel for high speed train", International Journal of Modern Physics B, vol. 33, No. 1-3, Jan. 30, 2019.

Jiao Jingpin et al., "Numerical Simulation of Nonlinear Interaction between Ultrasonic and Micro-cracks in Different Directions", Journal of Beijing University of Technology, vol. 44 No. 5, May 31, 2018.

* cited by examiner

METHOD FOR MEASURING DEVIATION ANGLE OF FATIGUE MICROCRACK BASED ON NONLINEAR ULTRASOUND

CROSS-REFERENCE TO RELATED APPLICATIONS

This application is a continuation of International Patent Application No. PCT/CN2022/075445 with a filing date of Feb. 8, 2022, designating the United States, now pending, and further claims priority to Chinese Patent Application No. 202110544098.7 with a filing date of May 19, 2021. The content of the aforementioned applications, including any intervening amendments thereto, are incorporated herein by reference.

TECHNICAL FIELD

The present invention relates to a method for measuring a deviation angle of a fatigue microcrack based on nonlinear ultrasound, and belongs to the field of ultrasonic nondestructive testing technologies.

BACKGROUND

Metal material has become an engineering material with the widest application range and most comprehensive coverage in engineering application due to good physical and chemical properties, mechanical property and molding process property. A component made of the metal material is used in extremely harsh and changeable environments, such as high temperature and high pressure, collision and impact, and chemical corrosion, for a long time, and meanwhile, microdamages are gradually formed in the metal material due to a comprehensive influence of factors, such as an alternating load effect, an improper production technology, and degradation of organizational structure, during use. In the long run, the accumulated microdamages further evolve into microcracks, so that the mechanical property of the material is greatly degraded. When the microcracks finally evolve into macrocracks, fracture failure may occur, and the fracture failure of the component poses a great threat to the stable operation of industrial equipment. Therefore, the accurate monitoring of an early structural damage of the metal material and the rapid testing and evaluation of a fatigue damage degree of the metal component can effectively avoid the sudden failure of the metal component from posing a potential threat to the stable use of the industrial equipment.

A traditional linear ultrasonic testing technology is based on a principle of acoustic elasticity. When being propagated to a tested material, a sound wave may interact with an internal damage, resulting in changes of parameters, such as a sound velocity, a waveform amplitude and a time delay, and a performance of the material is tested and evaluated by analyzing ultrasonic time domain signals. However, since linear ultrasound is extremely sensitive to changes of operation and environment, even differences in geometry and boundary of the material may cause changes of signals. In addition, the linear ultrasonic testing technology is not so sensitive to an early microcrack damage of the material, and response values of the measured parameters are generally very small, so that it is difficult to effectively characterize the evolution of the mechanical property of the material.

A nonlinear ultrasonic technology can make up for the shortcomings of the linear ultrasonic testing technology, and effectively characterize the early microdamage of the material. A basic principle of the nonlinear ultrasonic technology is that an inherent nonlinearity of the material interacts with a nonlinearity caused by the damage defect when testing signals are propagated in a solid, and the testing signals are distorted to generate second-order and higher-order harmonic frequency components. By using this characteristic, ultrasonic time domain information of the tested material is converted into frequency domain information, and high harmonic signals are extracted from the information, so as to obtain damage information of the tested material. The positioning and the angle measurement and prediction of the fatigue microcrack damage based on the nonlinear ultrasound have an important application value and a promotion effect for nondestructive testing of engineering structure damage.

SUMMARY

Object of the present invention: only a fatigue microcrack is positioned in the prior art without carrying out angle measurement, but the angle measurement of the fatigue microcrack can effectively characterize a damage of a material to prevent the material from failing due to a fatigue crack. The present invention aims to make a supplement to an existing microcrack positioning technology, and provide a method for measuring a deviation angle of a fatigue microcrack based on nonlinear ultrasound. According to the method, a deflection angle of a fatigue microcrack can be measured conveniently, quickly, accurately and intuitively at a low cost.

A technical solution used in the present invention to achieve the object is: a method for measuring a deviation angle of a fatigue microcrack based on nonlinear ultrasound, wherein the method comprises the following steps of:

S1: preliminarily positioning a fatigue microcrack for a metal plate containing a microcrack defect to obtain a center O of the microcrack;

wherein supplementary explanation is made on the step S1:

there are many methods for preliminarily positioning the fatigue microcrack, comprising, for example:

selecting an appropriate rectangular testing area on a surface of the metal plate, determining a plurality of horizontal and vertical measurement positions of an excitation transducer distributed at intervals along two intersecting sides of a rectangle respectively, placing a receiving transducer at a position on opposite sides of the rectangle and vertically symmetrical with the excitation transducer about a center line of the rectangle, measuring a relative nonlinear coefficient, moving the excitation transducer in an appropriate horizontal or vertical direction after each measurement and changing the position of the receiving transducer accordingly, and comparing each group of relative nonlinear coefficients, wherein a place with a maximum relative nonlinear coefficient is a center of the microcrack;

(reference: Huifang Wang. Research on Detection and Localization of Metal Fatigue Damage Based on Nonlinear Ultrasonic [D]. Tianjin University, 2017.)

S2: taking the center O of the microcrack as an origin on the surface of the metal plate, selecting a direction as a horizontal positive direction, and taking a counterclockwise included angle of the horizontal positive direction as an orientation angle $\alpha_x$;

S3: drawing a positive circumference on the surface of the metal plate with the center O of the microcrack as a center of circle and r as a radius, and selecting an appropriate fixed interval angle $\Delta\alpha$, wherein the orientation angle $\alpha_x$ satisfies that $\alpha_x = x \cdot \Delta\alpha$, and $0° \leq \alpha_x < 360°$; x is a number of change times of the orientation angle $\alpha_x$, and x=0, 1, 2, ..., n; and n is a value limit of the number of change times x of the orientation angle $\alpha_x$, and $$n = \frac{360° - \Delta\alpha}{\Delta\alpha}$$

(which means that a value of the orientation angle $\alpha_x$ satisfies that $\alpha_x = 0°, \Delta\alpha, 2\Delta\alpha, \ldots, n\Delta\alpha$);

S4: placing an excitation sensor and a receiving sensor on the drawn positive circumference in the step S3 according to the orientation angle $\alpha_x$, wherein the excitation sensor is placed at the orientation angle $\alpha_x$, and the receiving sensor is placed at a place symmetrical with the orientation angle $\alpha_x$ about the center O of the microcrack, and forming a group of ultrasonic sensing paths between corresponding excitation sensor and receiving sensor; sequentially increasing the number of change times x of the orientation angle $\alpha_x$, and changing positions of the excitation sensor and the receiving sensor to obtain n+1 groups of ultrasonic sensing paths; and ultrasonically testing each group of ultrasonic sensing paths, and recording time domain waveform signals formed by each group of ultrasonic sensing paths;

S5: converting each group of time domain waveform signals into a corresponding frequency domain graph, respectively extracting an ultrasonic fundamental wave signal amplitude $A_{1x}$ and a second harmonic waveform amplitude $A_{2x}$ in each group of frequency domain graph data, and calculating each group of relative nonlinear coefficients $\beta'_x$, wherein the relative nonlinear coefficient is that $$\beta'_x = \frac{A_{2x}}{A_{1x}^2};$$

and

S6: drawing an orientation angle $\alpha_x$—relative nonlinear coefficient $\beta'_x$ polar coordinate graph, wherein the drawn polar coordinate graph is an approximately symmetrical "leaf" pattern, an included angle between a vertical direction of a long axis of the approximately symmetrical "leaf" pattern and the horizontal positive direction is a deviation angle of the microcrack, and a range of the deviation angle of the microcrack is [0°, 180°) (which means that: in the orientation angle $\alpha_x$—relative nonlinear coefficient $\beta'_x$ polar coordinate graph, when a straight line in the vertical direction of the long axis of the approximately symmetrical "leaf" pattern passes through a polar point, an counterclockwise included angle between the straight line and a direction of a polar axis within [0°, 180°) is taken as the deviation angle of the microcrack); and the orientation angle αx-relative nonlinear coefficient β'x polar coordinate graph takes the $\alpha_x$ as a polar angle (which means that: it is specified that the polar axis is the horizontal positive direction in the step S2, and the polar point is the center O of the microcrack) and the relative nonlinear coefficient $\beta'_x$ as a polar radius.

Further, the step S4 specifically comprises:

S41: establishing a polar coordinate system on the surface of the metal plate with the center O of the microcrack as the polar point and the horizontal positive direction as the polar axis, wherein the orientation angle is that $\alpha_x = x \cdot \Delta\alpha$, and $0° \leq \alpha_x < 360°$, and the number of change times of the orientation angle $\alpha_x$ is that x=0, 1, 2, ..., n;

S42: when the orientation angle $\alpha_x$ satisfies that $0° \leq \alpha_x \leq 180°$, placing one excitation sensor at polar coordinates (r, $\alpha_x$) and one receiving sensor at polar coordinates (r, $\alpha_x + 180°$); when the orientation angle $\alpha_x$ satisfies that $180° < \alpha_x < 360°$, placing one excitation sensor at polar coordinates (r, $\alpha_x$) and one receiving sensor at polar coordinates (r, $\alpha_x - 180°$); and forming an $x^{th}$ group of ultrasonic sensing paths between corresponding excitation sensor and receiving sensor, wherein r is a radius of the positive circumference drawn in the step S3;

S43: ultrasonically testing the $x^{th}$ group of ultrasonic sensing paths, wherein ultrasound is excited by the excitation sensor and collected by the receiving sensor to obtain time domain waveform signals of the $x^{th}$ group of ultrasonic sensing paths, and recording the time domain waveform signals formed by the $x^{th}$ group of ultrasonic sensing paths by an oscilloscope; and S44: repeating the step S42 and the step S43 according to an order that the number of change times x of the orientation angle $\alpha_x$ is increased from 0 to n in sequence to obtain n+1 groups of ultrasonic sensing paths in total, and recording n+1 groups of corresponding time domain waveform signals in total.

Further, the step S5 specifically comprises:

S51: analyzing the $x^{th}$ group of time domain waveform signals, and converting the signals into a corresponding frequency domain graph, wherein x is the number of change times of the orientation angle $\alpha_x$, and x=0, 1, 2, ..., n;

S52: extracting the ultrasonic fundamental wave signal amplitude $A_{1x}$ and the second harmonic waveform amplitude $A_{2x}$ from the $x^{th}$ group of frequency domain graph data, wherein a fundamental wave signal frequency is close to a center frequency of the excitation sensor, and a second harmonic frequency is twice that of the fundamental wave frequency;

S53: obtaining the $x^{th}$ group of relative nonlinear coefficients $\beta'_x$ by calculating according to $$\beta'_x = \frac{A_{2x}}{A_{1x}^2};$$

and

S54: repeating the step S51 to the step S53, and calculating n+1 groups of relative nonlinear coefficients in total.

Further, the fixed interval angle $\Delta\alpha$ satisfies that $0° < \Delta\alpha \leq 60°$.

Further, the value limit n of the number of change times x of the orientation angle $\alpha_x$ is not less than 5.

The value limit n of the number of change times x of the orientation angle $\alpha_x$ is not less than 5 to ensure an accuracy of angle measurement of the microcrack.

Further, a center frequency of the receiving sensor is twice that of the excitation sensor.

Further, algorithms for converting the time domain waveform signals into the frequency domain graph comprise fast Fourier transform and Fourier transform.

Further, the fixed interval angle $\Delta\alpha$ is 15°; or the fixed interval angle $\Delta\alpha$ is 20°; or the fixed interval angle $\Delta\alpha$ is 30°; or the fixed interval angle $\Delta\alpha$ is 45°.

Further, the center frequency of the receiving sensor is 5 MHz, and the center frequency of the excitation sensor is 2.5 MHz.

Compared with the prior art, the present invention has the beneficial effects as follows.

(1) According to the method of the present invention, the angle measurement is further carried out on the fatigue microcrack based on the positioning of the fatigue microcrack, and a damage of a material can be effectively characterized by combining the positioning and the angle measurement of the fatigue microcrack to prevent the material from failing due to a fatigue crack. The method of the present invention is a supplement for an existing microcrack positioning technology, provides a feasibility for measuring the deviation angle of the fatigue microcrack, and has an important application value and a promotion effect for nondestructive testing of engineering structure damage.

(2) According to the method of the present invention, distortion and other characteristics of the nonlinear ultrasonic signals are used to change the orientation angle so as to obtain multiple groups of ultrasonic sensing paths, and the method for measuring the deflection angle of the fatigue microcrack with the assist of the orientation angle—relative nonlinear coefficient polar coordinate graph is proposed by analyzing the frequency domain graph.

(3) The measurement of the fatigue microcrack by the method of the present invention has the advantages of rapidness, intuition, high accuracy, low cost, low requirements for operators, and the like.

The present invention is further described in detail hereinafter with reference to the specific implementations and the drawings.

DETAILED DESCRIPTION

Embodiment

In this embodiment, a 6005A aluminum alloy plate with a geometric size of 120 mm×30 mm×4 mm is taken as a sample to be tested, it is known that there is an actually prefabricated fatigue microcrack in the sample to be tested, a center of the actually prefabricated fatigue microcrack is located at a center of the sample to be tested, and a deviation angle of the microcrack is an included angle of 60° with a horizontal direction selected later. The sample to be tested is now measured by a method for measuring a deviation angle of a fatigue microcrack based on nonlinear ultrasound of the present invention, comprising the following measurement steps.

In S1, the fatigue microcrack of the sample to be tested is preliminarily positioned to obtain a center O of the microcrack.

An appropriate rectangular testing area is selected on a surface of the metal plate, a plurality of horizontal and vertical measurement positions of an excitation transducer distributed at intervals are determined along two intersecting sides of a rectangle respectively, a receiving transducer is placed at a position on opposite sides of the rectangle and vertically symmetrical with the excitation transducer about a center line of the rectangle, a relative nonlinear coefficient is measured, the excitation transducer is moved in an appropriate horizontal or vertical direction after each measurement and the position of the receiving transducer is changed accordingly, and each group of relative nonlinear coefficients is compared, wherein a place with a maximum relative nonlinear coefficient is the center of the microcrack.

In this embodiment, it is tested that the center O of the microcrack of the sample to be tested is located at the center of the sample to be tested.

Figure 1:
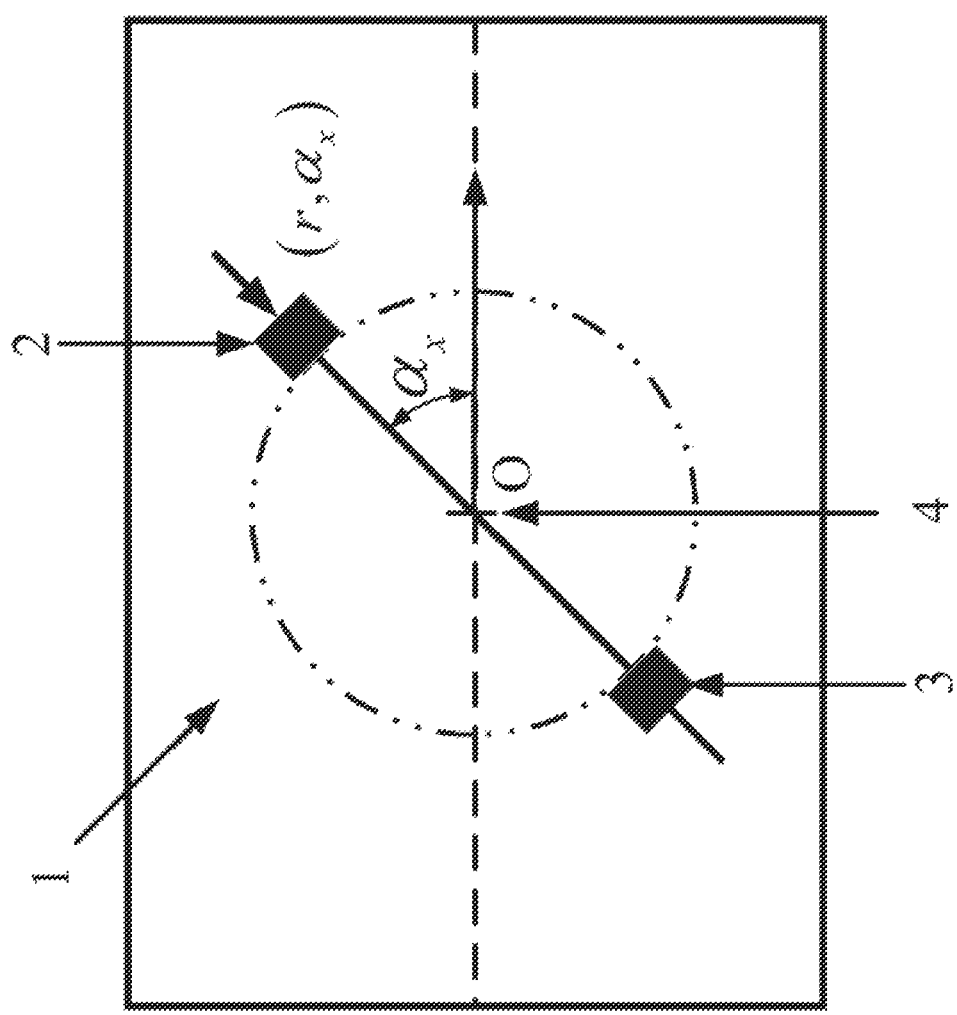
FIG. 1 is a schematic diagram of placement positions of a group of excitation sensor and receiving sensor in an embodiment of the present invention; wherein 1 is a sample to be tested, 2 is the excitation sensor, 3 is the receiving sensor, and 4 is a center O of a microcrack of the sample to be tested.

In S2, the center O of the microcrack is taken as an origin on the surface of the metal plate, a direction is selected as a horizontal positive direction, and a counterclockwise included angle of the horizontal positive direction is taken as an orientation angle $\alpha_x$, as shown in FIG. 1.

In S3, a positive circumference is drawn on the surface of the metal plate with the center O of the microcrack as a center of circle and r of 15 mm as a radius, as shown in FIG. 1, and a fixed interval angle $\Delta\alpha$ of 15° is selected, wherein the orientation angle $\alpha_x$ satisfies that $\alpha_x = x \cdot \Delta\alpha$, and $0° \leq \alpha_x < 360°$; x is a number of change times of the orientation angle $\alpha_x$, and x=0, 1, 2, . . . , n; and a value limit of the number of change times x of the orientation angle $\alpha_x$ is that $$n = \frac{360° - \Delta\alpha}{\Delta\alpha} = \frac{360° - 15°}{15°} = 23.$$

That is to say, values of the orientation angle $\alpha_x$ in this embodiment are 0°, 15°, 30°, . . . , 345° in sequence.

In S4, an excitation sensor and a receiving sensor are placed on the drawn positive circumference in the step S3 according to the orientation angle $\alpha_x$, wherein the excitation sensor is placed at the orientation angle $\alpha_x$, and the receiving sensor is placed at a place symmetrical with the orientation angle $\alpha_x$ about the center O of the microcrack, and a group of ultrasonic sensing paths is formed between corresponding excitation sensor and receiving sensor, as shown in FIG. 1; the number of change times x of the orientation angle $\alpha_x$ is sequentially increased, and positions of the excitation sensor and the receiving sensor are changed to obtain 24 groups of ultrasonic sensing paths; and each group of ultrasonic sensing paths is ultrasonically tested, and time domain waveform signals formed by each group of ultrasonic sensing paths are recorded.

In this embodiment, a center frequency of the receiving sensor is twice that of the excitation sensor, and specifically, the center frequency of the receiving sensor is 5 MHz, and the center frequency of the excitation sensor is 2.5 MHz.

In this embodiment, the step S4 specifically comprises the following.

In S41, a polar coordinate system is established on the surface of the metal plate with the center O of the microcrack as a polar point and the horizontal positive direction as a polar axis, wherein the orientation angle is that $\alpha_x = x \cdot \Delta\alpha$, and $0°≤α_x<360°$, and the number of change times of the orientation angle $α_x$ is that x=0, 1, 2, ..., 23.

In S42, when the orientation angle $α_x$ satisfies that $0°≤α_x≤180°$, one excitation sensor is placed at polar coordinates (r, $α_x$) and one receiving sensor is placed at polar coordinates (r, $α_x+180°$) (as shown in FIG. 1); when the orientation angle $α_x$ satisfies that $180°<α_x<360°$, one excitation sensor is placed at polar coordinates (r, $α_x$) and one receiving sensor is placed at polar coordinates (r, $α_x-180°$); and an $x^{th}$ group of ultrasonic sensing paths is formed between corresponding excitation sensor and receiving sensor, wherein r is a radius of the positive circumference drawn in the step S3.

In S43, the $x^{th}$ group of ultrasonic sensing paths is ultrasonically tested, wherein ultrasound is excited by the excitation sensor and collected by the receiving sensor to obtain time domain waveform signals of the $x^{th}$ group of ultrasonic sensing paths, and the time domain waveform signals formed by the $x^{th}$ group of ultrasonic sensing paths are recorded by an oscilloscope.

In S44, the step S42 and the step S43 are repeated according to an order that the number of change times x of the orientation angle $α_x$ is increased from 0 to 23 in sequence to obtain 24 groups of ultrasonic sensing paths in total, and 24 groups of corresponding time domain waveform signals are recorded in total.

In S5, each group of time domain waveform signals is converted into a corresponding frequency domain graph, an ultrasonic fundamental wave signal amplitude $A_{1x}$ and a second harmonic waveform amplitude $A_{2x}$ in each group of frequency domain graph data are respectively extracting, and each group of relative nonlinear coefficients $β'_x$ is calculated, wherein the relative nonlinear coefficient is that $$β'_x = \frac{A_{2x}}{A_{1x}^2}.$$

In this embodiment, the step S5 specifically comprises the following.

In S51, the $x^{th}$ group of time domain waveform signals is analyzed, and the signals are converted into a corresponding frequency domain graph, wherein x is the number of change times of the orientation angle $α_x$, and x=0, 1, 2, ..., 23. An algorithm for converting the time domain waveform signals into the frequency domain graph is fast Fourier transform.

In S52, the ultrasonic fundamental wave signal amplitude $A_{1x}$ and the second harmonic waveform amplitude $A_{2x}$ are extracted from the $x^{th}$ group of frequency domain graph data, wherein a fundamental wave signal frequency is close to a center frequency of the excitation sensor, and a second harmonic frequency is twice that of the fundamental wave frequency.

In S53, the $x^{th}$ group of relative nonlinear coefficients $β'_x$ is obtained by calculating according to $$β'_x = \frac{A_{2x}}{A_{1x}^2}.$$

In S54, the step S51 to the step S53 are repeated, and 24 groups of relative nonlinear coefficients are calculated in total.

Figure 2:
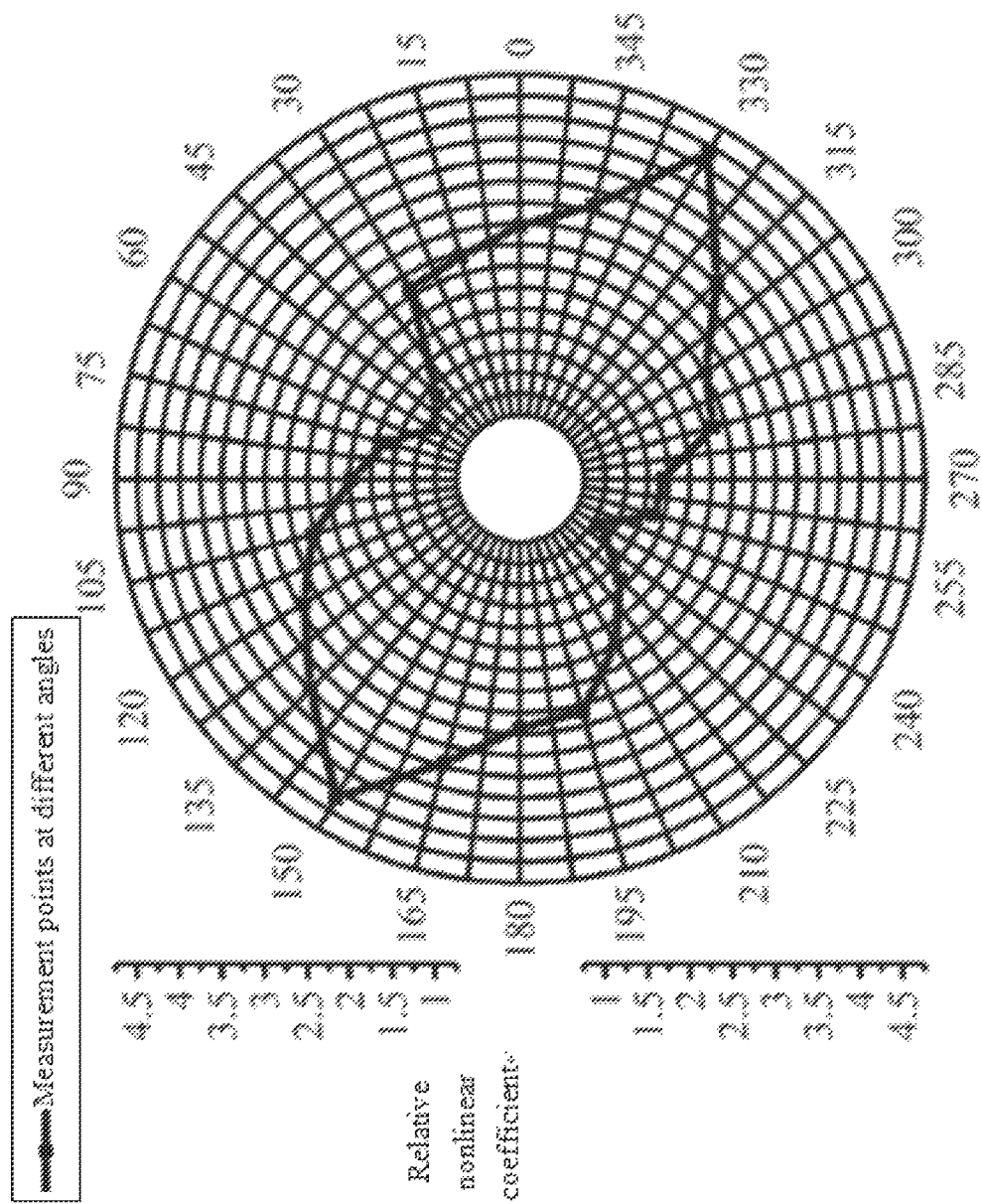
FIG. 2 is a polar coordinate diagram of orientation angle—relative nonlinear coefficient in the embodiment of the present invention.

In S6, an orientation angle $α_x$—relative nonlinear coefficient $β'_x$ polar coordinate graph is drawn with the $α_x$ as a polar angle and the relative nonlinear coefficients $β'_x$ as a polar axis, wherein the drawn polar coordinate graph is an approximately symmetrical "leaf" pattern, as shown in FIG. 2, an included angle between a vertical direction of a long axis of the approximately symmetrical "leaf" pattern and the horizontal positive direction is a deviation angle of the microcrack, and the deviation angle of the microcrack measured in this embodiment is an included angle of 60° with the selected horizontal direction (which means that: in this embodiment, in the orientation angle $α_x$—relative nonlinear coefficient $β'_x$ polar coordinate graph, when a straight line in the vertical direction of the long axis of the approximately symmetrical "leaf" pattern passes through a polar point, an counterclockwise included angle between the straight line and a direction of a polar axis within [0°, 180°) is 60°).

It can be seen from the above that a measurement result of the sample to be tested by the method for measuring the deviation angle of the fatigue microcrack based on the nonlinear ultrasound of the present invention is consistent with the deviation angle of the actually prefabricated fatigue microcrack. Therefore, the method of the present invention provides a feasibility for measuring the deviation angle of the fatigue microcrack.

In addition, the fixed interval angle $Δα$ in this embodiment may also be other angles satisfying that $0°<Δα≤60°$, such as 20°, 30° and 45°, wherein a measurement method is the same as that in this embodiment, and a measurement result is also consistent with an actual situation, which will not be repeated herein.

The above embodiments only express some specific implementations of the present invention, and the descriptions thereof are specific and detailed, but the embodiments cannot be understood as limiting the scope of protection of the present invention. It should be pointed out that those of ordinary skills in the art may further make several modifications and improvements without departing from the concept of the present invention, and these modifications and improvements all fall within the scope of protection of the present invention.

The invention claimed is:

1. A method for measuring a deviation angle of a fatigue microcrack based on nonlinear ultrasound, wherein the method comprises the following steps of:
   S1: preliminarily positioning a fatigue microcrack for a metal plate containing a microcrack defect to obtain a center O of the microcrack;
   S2: taking the center O of the microcrack as an origin on a surface of the metal plate, selecting a direction as a horizontal positive direction, and taking a counterclockwise included angle of the horizontal positive direction as an orientation angle $α_x$;
   S3: drawing a positive circumference on the surface of the metal plate with the center O of the microcrack as a center of circle and r as a radius, and selecting an appropriate fixed interval angle $Δα$, wherein the orientation angle $α_x$ satisfies that $α_x=x·Δα$, and $0°≤α_x<360°$; x is a number of change times of the orientation angle $α_x$, and x=0, 1, 2, ..., n; and n is a value limit of the number of change times x of the orientation angle $α_x$, $$n = \frac{360° - Δα}{Δα};$$

S4: placing an excitation sensor and a receiving sensor on the drawn positive circumference in the step S3 according to the orientation angle $\alpha_x$, wherein the excitation sensor is placed at the orientation angle $\alpha_x$, and the receiving sensor is placed at a place symmetrical with the orientation angle $\alpha_x$ about the center O of the microcrack, and forming a group of ultrasonic sensing paths between corresponding excitation sensor and receiving sensor; sequentially increasing the number of change times x of the orientation angle $\alpha_x$, and changing positions of the excitation sensor and the receiving sensor to obtain n+1 groups of ultrasonic sensing paths; and ultrasonically testing each group of ultrasonic sensing paths, and recording time domain waveform signals formed by each group of ultrasonic sensing paths;

S5: converting each group of time domain waveform signals into a corresponding frequency domain graph, respectively extracting an ultrasonic fundamental wave signal amplitude $A_{1x}$ and a second harmonic waveform amplitude $A_{2x}$ in each group of frequency domain graph data, and calculating each group of relative nonlinear coefficients $\beta'_x$, wherein the relative nonlinear coefficient is that $$\beta'_x = \frac{A_{2x}}{A_{1x}^2};$$

and

S6: drawing an orientation angle $\alpha_x$—relative nonlinear coefficient $\beta'_x$ polar coordinate graph, wherein the drawn polar coordinate graph is an approximately symmetrical "leaf" pattern, an included angle between a vertical direction of a long axis of the approximately symmetrical "leaf" pattern and the horizontal positive direction is a deviation angle of the microcrack, and a range of the deviation angle of the microcrack is [0°, 180°); and the orientation angle $\alpha_x$—relative nonlinear coefficient $\beta'_x$ polar coordinate graph takes the $\alpha_x$ as a polar angle and the relative nonlinear coefficient $\beta'_x$ as a polar radius.

2. The method for measuring the deviation angle of the fatigue microcrack based on the nonlinear ultrasound according to claim 1, wherein the step S4 specifically comprises:

S41: establishing a polar coordinate system on the surface of the metal plate with the center O of the microcrack as a polar point and the horizontal positive direction as a polar axis, wherein the orientation angle is that $\alpha_x = x \cdot \Delta\alpha$, and $0° \leq \alpha_x < 360°$, and the number of change times of the orientation angle $\alpha_x$ is that x=0, 1, 2, ..., n;

S42: when the orientation angle $\alpha_x$ satisfies that $0° \leq \alpha_x \leq 180°$, placing one excitation sensor at polar coordinates (r, $\alpha_x$) and one receiving sensor at polar coordinates (r, $\alpha_x + 180°$); when the orientation angle $\alpha_x$ satisfies that $180° < \alpha_x < 360°$, placing one excitation sensor at polar coordinates (r, $\alpha_x$) and one receiving sensor at polar coordinates (r, $\alpha_x - 180°$); and forming an $x^{th}$ group of ultrasonic sensing paths between corresponding excitation sensor and receiving sensor, wherein r is a radius of the positive circumference drawn in the step S3;

S43: ultrasonically testing the $x^{th}$ group of ultrasonic sensing paths, wherein ultrasound is excited by the excitation sensor and collected by the receiving sensor to obtain time domain waveform signals of the $x^{th}$ group of ultrasonic sensing paths, and recording the time domain waveform signals formed by the $x^{th}$ group of ultrasonic sensing paths by an oscilloscope; and S44: repeating the step S42 and the step S43 according to an order that the number of change times x of the orientation angle $\alpha_x$ is increased from 0 to n in sequence to obtain n+1 groups of ultrasonic sensing paths in total, and recording n+1 groups of corresponding time domain waveform signals in total.

3. The method for measuring the deviation angle of the fatigue microcrack based on the nonlinear ultrasound according to claim 2, wherein a center frequency of the receiving sensor is twice that of the excitation sensor.

4. The method for measuring the deviation angle of the fatigue microcrack based on the nonlinear ultrasound according to claim 1, wherein the step S5 specifically comprises:

S51: analyzing the $x^{th}$ group of time domain waveform signals, and converting the signals into a corresponding frequency domain graph, wherein x is the number of change times of the orientation angle $\alpha_x$, and x=0, 1, 2, ..., n;

S52: extracting the ultrasonic fundamental wave signal amplitude $A_{1x}$ and the second harmonic waveform amplitude $A_{2x}$ from the $x^{th}$ group of frequency domain graph data, wherein a fundamental wave signal frequency is close to a center frequency of the excitation sensor, and a second harmonic frequency is twice that of the fundamental wave frequency;

S53: obtaining the $x^{th}$ group of relative nonlinear coefficients $\beta'_x$ by calculating according to $$\beta'_x = \frac{A_{2x}}{A_{1x}^2};$$

and

S54: repeating the step S51 to the step S53, and calculating n+1 groups of relative nonlinear coefficients in total.

5. The method for measuring the deviation angle of the fatigue microcrack based on the nonlinear ultrasound according to claim 4, wherein algorithms for converting the time domain waveform signals into the frequency domain graph comprise fast Fourier transform and Fourier transform.

6. The method for measuring the deviation angle of the fatigue microcrack based on the nonlinear ultrasound according to claim 1, wherein the fixed interval angle $\Delta\alpha$ satisfies that $0° < \Delta\alpha \leq 60°$.

7. The method for measuring the deviation angle of the fatigue microcrack based on the nonlinear ultrasound according to claim 6, wherein the fixed interval angle $\Delta\alpha$ is 15°; or the fixed interval angle $\Delta\alpha$ is 20°; or the fixed interval angle $\Delta\alpha$ is 30°; or the fixed interval angle $\Delta\alpha$ is 45°.

8. The method for measuring the deviation angle of the fatigue microcrack based on the nonlinear ultrasound according to claim 1, wherein the value limit n of the number of change times x of the orientation angle $\alpha_x$ is not less than 5.

9. The method for measuring the deviation angle of the fatigue microcrack based on the nonlinear ultrasound according to claim 1, wherein a center frequency of the receiving sensor is twice that of the excitation sensor.

10. The method for measuring the deviation angle of the fatigue microcrack based on the nonlinear ultrasound according to claim 9, wherein the center frequency of the receiving sensor is 5 MHz, and the center frequency of the excitation sensor is 2.5 MHz.

11. The method for measuring the deviation angle of the fatigue microcrack based on the nonlinear ultrasound according to claim 1, wherein algorithms for converting the time domain waveform signals into the frequency domain graph comprise fast Fourier transform and Fourier transform.

12. The method for measuring the deviation angle of the fatigue microcrack based on the nonlinear ultrasound according to claim 1, wherein the fixed interval angle $\Delta\alpha$ is 15°; or the fixed interval angle $\Delta\alpha$ is 20°; or the fixed interval angle $\Delta\alpha$ is 30°; or the fixed interval angle $\Delta\alpha$ is 45°.

* * * * *